Oct. 16, 1962
A. C. HAGG ETAL
3,058,705
RESILIENT SUPPORT SYSTEM FOR VERTICAL
AXIS MOTOR COMPRESSOR UNIT
Filed March 26, 1958
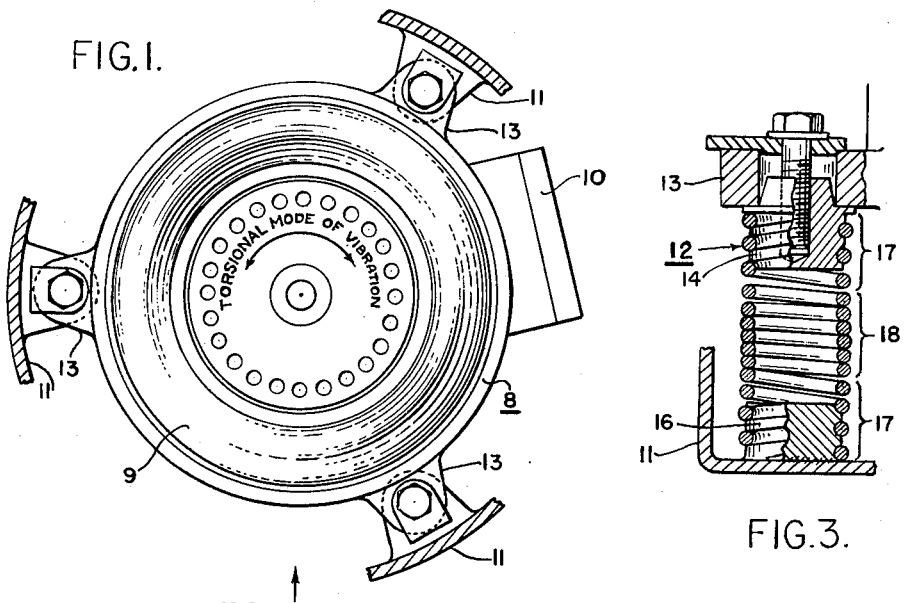
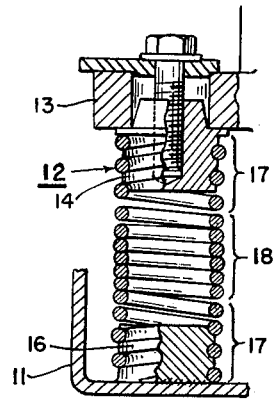
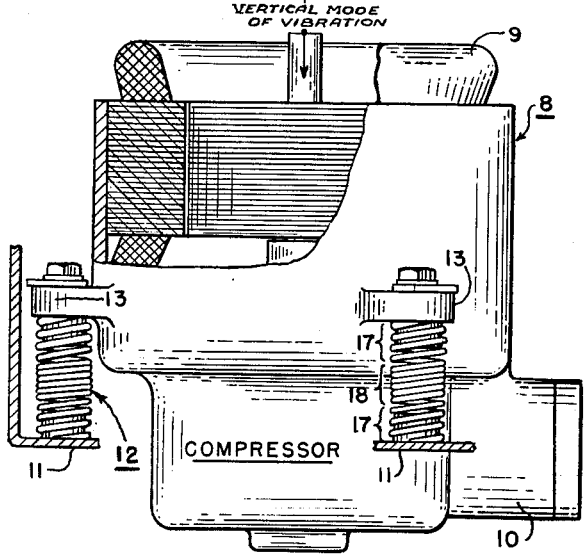
INVENTORS
ARTHUR C. HAGG
REGIS D. HEITCHUE SR.
BY *William J. Foley*
ATTORNEY United States Patent Office 3,058,705
Patented Oct. 16, 1962

3,058,705
RESILIENT SUPPORT SYSTEM FOR VERTICAL AXIS MOTOR COMPRESSOR UNIT
Arthur C. Hagg, Pittsburgh, Pa., and Regis D. Heitchue, Sr., Longmeadow, Mass., assignors to Westinghouse Electric Corporation, East Pittsburgh, Pa., a corporation of Pennsylvania
Filed Mar. 26, 1958, Ser. No. 724,132
3 Claims. (Cl. 248—20)

This invention relates to means for resiliently mounting a motor-compressor unit in such apparatus as refrigerators, air conditioners and the like.

Although conventional helical compression springs serve as isolators and supports to minimize the transmission of vibration from a motor-compressor unit to a rigid supporting structure, their characteristics are such that a single force or moment applied to the springs causes deflections in two or more directions or planes. For example, a force at right angles to the helical spring axis produces a linear deflection in the direction of the force, a linear deflection at right angles to the force and an angular deflection in the plane of the force. Thus, helical springs combine with the mass of the motor-compressor unit and result in a spring-mass system with vibrational movements in any or all of several directions and planes, even though a force or moment is applied in only one direction or plane. These vibrational movements are particularly excessive and troublesome during starting and stopping the unit, when large moments or torques are suddenly applied or removed. And, in order to prevent the motor-compressor unit from striking surrounding parts of the apparatus, large clearances must be provided. The present invention is directed to eliminating the need for large clearances and minimizing the overall size of the apparatus, by means of an improved spring support and isolation system. This system reduces excessive lateral and vertical movements of the motor-compressor unit during starting and stopping, and also provides additional vibration damping.

In accordance with this invention, there is provided, for resiliently mounting a vertical axis motor-compressor unit on a supporting structure, a plurality of coiled springs, each constructed so that some of its coils are wound closely together, and preferably with initial tension, to increase the ratio of axial stiffness to lateral stiffness of each spring. The springs are spaced from each other and the rotational axis of the motor-compressor unit, with the longitudinal axes of the springs disposed vertically. By this arrangement the angular movements of the motor-compressor unit about its vertical axis are accompanied by lateral deflections of the springs, and vertical movements of the motor-compressor unit are accompanied by axial deflections of the springs. Each spring of the present invention has approximately the same lateral stiffness, but far greater axial stiffness, than conventional compression springs of similar size, thus placing the lowest natural frequency of the spring and motor-compressor system in the torsional mode of vibration (about the shaft axis of the motor-compressor unit), which corresponds to the mode of principal excitation. The coils wound with initial tension are in contact with each other so that during angular movement of the motor-compressor unit about the shaft axis, the springs deflect laterally and the frictional contact of the coils helps to damp out vibration.

The various objects, features and advantages of the invention will appear more fully from the detailed description which follows, taken in connection with the accompanying drawings, forming a part of this application, in which:

FIG. 1 is a plan view of a motor-compressor unit and the mounting springs of this invention;

FIG. 2 is an elevational view of the motor-compressor unit and mounting springs of FIG. 1, showing portions of the supporting structure;

FIG. 3 is a vertical sectional view showing an enlarged fragmentary portion of the spring suspension system shown in FIG. 2, illustrating the mounting means in greater detail; and FIG. 4 is an enlarged elevational view of one of the springs of FIG. 2.

The motor-compressor unit to which the invention is applied is indicated generally by the numeral 8 and includes a housing which encloses a vertical axis motor 9 and a vertical axis refrigerant compressor 10 arranged to be driven by the shaft of the motor. The motor-compressor unit 8 is resiliently mounted on a rigid supporting structure 11 by means of three unique helical compression springs 12 which support the weight of the unit 8 and also serve as vibration isolators.

Extending radially outward from the housing of the unit 8, and spaced about the periphery thereof, are three lugs 13, each of which has a vertical hole formed therein to receive a downwardly extending spring retaining stud 14. (See FIG. 3.) Suitable fastening means, such as a bolt, lock plate, and washer, anchor the studs 14 in position. Three spring retaining studs 16, similar to the studs 14, are secured to the support 11 and extend upwardly therefrom, in axial alignment with the studs 14. The coiled ends of each spring 12 are received and positioned on each associated pair of studs 14 and 16, and the assembly serves as a resilient mounting connection between the motor-compressor unit 8 and the supporting structure 11.

As best seen in FIG. 4, each spring 12 is like the other and defines a substantially cylindrical body of unitary construction, being wound from a length of resilient wire having a uniformly round cross section, and comprises a series of coils lying in helical formation about a vertical, longitudinal axis of the spring. Preferably the ends of the spring are squared and ground, as shown, to provide a large, flat contact surface.

Except in the middle portion of the spring 12, the coils are wound in spaced relation to each other, in the manner of conventional compression springs, so that their pitch is substantially greater than the diameter of the wire from which they are formed. The spaced, or end, coils, designated by the numeral 17, are separated by intermediate coils 18 which are wound closely together. Preferably the intermediate coils 18 are wound with initial tension, that is, the intermediate coils 18 require the application of initial tension in the axial direction before the coils begin to separate or deflect under further tension. The wire from which the intermediate coils 18 are formed is pre-stressed in torsion during the winding operation, so that the coils 18 compress themselves together axially and have a pitch of substantially the same dimension as the diameter of the spring wire. The method used for winding coils with initial tension, or tension turns, is well known by makers of springs, since this type of winding is often used in the making of extension springs. However, in the present application, the intermediate coils 18 provide improved vibration damping and a means for confining vibration of the unit 8 to the torsional mode when these coils 18 are formed integrally and in series with the compression-type end coils 17.

The use of intermediate coils 18 wound with initial tension lends increased axial stiffness to the springs 12, but effects only a small increase in lateral stiffness. The support system, made up of several such springs, therefore, inhibits vertical movements of the motor-compressor unit 8 while affording the unit relative freedom of angular movement about the vertical axis of the unit.

The desirability of supporting the motor-compressor unit 8 by a system having the above-mentioned characteristics can be explained in the following manner:

The starting and stopping of motor-compressor units that are resiliently supported by conventional springs is often accompanied by objectional noises caused by the motor-compressor striking surrounding parts of the apparatus. It has been found that these noises occur when the unit experiences large vertical and/or lateral vibrational movements which exceed the clearances provided between the unit and the parts surrounding it and despite the fact that the exciting forces from the primary disturbance are of the type that tend to cause angular movement of the unit about its shaft axis, in the torsional mode of vibration.

The obvious solution to the problem of objectional noises would be to increase the clearances, but this solution is unsatisfactory in applications where additional space cannot be provided without increasing the overall size of the apparatus.

An analysis of the phenomenon which causes vibration of the unit in the vertical and/or lateral modes, from excitating forces originating in the torsional mode of vibration, reveals that the directional transfer of vibration energy can be attributed to coupling effects in the supporting system. This condition is most acute during starting and stopping of the unit, because the frequency of the disturbing source then approaches the lowest natural frequency of the unit and spring system, which natural frequency commonly lies in the vertical mode of vibration in apparatus using conventional spring isolators.

Further study of this phenomenon reveals that, to a large extent, the vibration of the unit and spring system can be confined to the torsional mode of vibration, if the natural frequency of the system in torsion is lower than any other mode by a margin of at least twenty percent. In a supporting system of the type herein considered, and wherein the motor-compressor unit 8 is mounted on a plurality of vertical axis helical springs, the frequencies in the various vibrational modes are determined by the ratio of lateral stiffness to vertical stiffness, which, in turn, can be varied by selecting springs of different diameter to length ratios. It can be appreciated that a supporting system utilizing tall springs of small diameter will have less lateral stiffness than a supporting system employing relatively shorter or larger diameter springs. For many applications, however, it is impractical to achieve the desired ratio of lateral stiffness to vertical stiffness by means of conventional helical compression springs, because such springs would have dimensions comparable to tall, thin columns that are subject to buckling when acting as supporting members.

In accordance with this invention, springs 12 are utilized which have conventionally wound, spaced end coils 17 and intermediate or middle coils 18 wound closely together, preferably with initial tension. This type of spring 12 has a vertical to lateral stiffness ratio that is greater than the same ratio for conventional helical compression springs, and it is, therefore, possible to provide a resilient supporting system which has the desired stiffness ratios and frequency characteristics.

For example, in one application of the teachings of this invention, a conventionally wound compression spring would require the working height to be more than three times the mean coil diameter in order to obtain the desired natural frequencies. Using the spring construction of the present invention, a spring having the same mean coil diameter as the above conventional spring requires a working height to coil diameter ratio of only 2, because half of the coils in this spring are wound with initial tension. This result is possible because a spring which has half of its coils wound with initial tension has twice the axial stiffness of a similar spring, wound conventionally, but its lateral stiffness is increased by only fourteen percent.

Spring vibration isolators may also be capable of damping out vibration, without assistance from viscous dampers and the like, by dissipating energy through material damping or internal molecular friction within the spring itself. Quite often, however, the amplitude of vibration will not decay before the succeeding exciting forces are received, and the vibration can build up to undesirably large amplitudes. The arrangement of the intermediate coils 18 in the present invention provides additional damping for the system through external surface friction, because the surfaces of these coils are in sliding contact with each other when the spring undergoes lateral deflection.

In addition, the closely wound intermediate coils 18 of the springs 12 enable these springs to exercise a greater snubbing action on vertical movements of the motor-compressor unit than conventional helical springs of the same overall height. It can be appreciated that the intermediate coils 18 of the springs 12 will remain inactive during up and down movements of the motor-compressor unit 8. In effect, then, the vertical movements of the motor-compressor unit are limited to deflections of the free, or spaced, coils of the springs, and extreme movements of the unit are, therefore, prevented.

From the foregoing, it is apparent that the springs 12 of this invention not only reduce the transmission of vibration from the motor-compressor unit 8 to the supporting structure 11, but also help to damp out undesirable vibrations and prevent them from building up to excessive amplitudes. These springs 12 are especially effective in confining the vibration to the torsional mode, which corresponds to the vibrational mode of the primary source of excitation during starting and stopping of the motor-compressor unit 8, thereby eliminating large vertical and/or lateral movements of the unit and any need for increased clearances.

While the invention has been shown in but one form, it will be obvious to those skilled in the art that it is not so limited, but is susceptible of various changes and modifications without departing from the spirit thereof.

What is claimed is:

1. In refrigeration apparatus, means for resiliently mounting a motor-compressor unit having a shaft and permitting axial, lateral and torsional movement of said unit relative the axis of said shaft, said means including a plurality of helical compression springs formed of resilient wire; each of said springs defining a substantially cylindrical body and comprising a series of coils lying in helical formation about the longitudinal axis thereof, said spring axis being substantially parallel to said shaft axis, a plurality of said coils intermediate the ends of said series being wound with initial tension and having a pitch substantially equal to the thickness of said wire measured longitudinally of said spring, and the other of said coils having a pitch substantially greater than the thickness of said wire measured longitudinally of said spring; the ratio of the number of coils wound with initial tension to the number of other coils in each spring being such that the lowest natural frequency of the unit and springs is in a mode of angular movement about the axis of the motor-compressor shaft.

2. The combination of a vertical axis motor-compressor unit having a shaft, a rigid supporting structure, and improved means including a plurality of compression springs for resiliently supporting said unit on said structure, said means being vertically and horizontally deflectable; each of said springs comprising a series of coils defining a substantially cylindrical body and lying in helical formation about a substantially vertical axis extending longitudinally of said springs; said series including a plurality of coils intermediate the ends thereof which are wound in contact with one another, and a plurality of coils at each end of the intermediate coils which are wound in spaced relation to one another, said coils which are wound in contact with one another having the effect of increasing the ratio of axial stiffness to lateral stiffness of the supporting system.

3. The combination of a vertical axis motor-compressor unit having a shaft, a rigid supporting structure, and improved means including a plurality of compression springs for resiliently supporting said unit on said structure, said means being vertically and horizontally deflectable; each of said springs comprising a series of coils lying in helical formation about a substantially vertical axis extending longitudinally of said spring; each of said springs being characterized by having a plurality of coils intermediate the ends thereof which are wound closely together and with initial tension, and a plurlaity of coils at each end of the intermediate coils which are wound in spaced relation to one another, said coils which are wound closely together and with initial tension having the effect of increasing the ratio of axial stiffness to lateral stiffness of the supporting system.

References Cited in the file of this patent

UNITED STATES PATENTS

| 1,565,822 | Smith | Dec. 15, 1925 |
| 1,928,688 | Hayward | Oct. 3, 1933 |
| 2,028,584 | Bixler | Jan. 21, 1936 |
| 2,643,109 | Wood | June 23, 1953 |